(12) United States Patent
Alexander et al.

(10) Patent No.: US 7,587,625 B2
(45) Date of Patent: Sep. 8, 2009

(54) MEMORY REPLAY MECHANISM

(75) Inventors: James W. Alexander, Aloha, OR (US);
Rajat Agarwal, Beaverton, OR (US);
Joaquin B. Romera, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 387 days.

(21) Appl. No.: 11/357,492

(22) Filed: Feb. 16, 2006

(65) Prior Publication Data

US 2007/0226579 A1 Sep. 27, 2007

(51) Int. Cl.
*G06F 11/00* (2006.01)
(52) U.S. Cl. .................... 714/5; 714/6; 714/42
(58) Field of Classification Search .......... 714/5, 714/6, 18, 42, 43
See application file for complete search history.

(56) References Cited

U.S. PATENT DOCUMENTS

| | | | |
|---|---|---|---|
| 6,333,929 B1 | 12/2001 | Drottar et al. | |
| 6,766,429 B1 * | 7/2004 | Bland et al. | 714/6 |
| 7,292,950 B1 * | 11/2007 | Resnick | 714/5 |
| 7,320,086 B2 * | 1/2008 | Majni et al. | 714/5 |
| 2004/0117579 A1 | 6/2004 | Wu et al. | |
| 2004/0117580 A1 * | 6/2004 | Wu et al. | 711/170 |
| 2005/0071563 A1 * | 3/2005 | Kuttanna et al. | 711/119 |
| 2005/0166026 A1 * | 7/2005 | Ware et al. | 711/167 |
| 2006/0026375 A1 | 2/2006 | Christenson et al. | |

OTHER PUBLICATIONS

Pending U.S. Appl. No. 11/165,693, filed Jun. 24, 2005, Inventor: James W. Alexander, et al.
Pending U.S. Appl. No. 11/321,322, filed Dec. 28, 2005, Inventor James W. Alexander, et al.
Infineon Technologies: Intel Dual-Channel DDR Memory Architecture White Paper; Rev. 1.0, Sep. 2003; 14 pages.
Pending U.S. Appl. No. 11/240,823, filed Sep. 30, 2005, inventor: Alexander et al.
Pending U.S. Appl. No. 11/073,285, filed Mar. 3, 2005, inventor: Christensonet al.
Pending U.S. Appl. No. 11/240,111, filed Sep. 30, 2005, inventor: Alexander et al.
International Report on Patentability for corresponding matter P22947PCT mailed Aug. 28, 2008.

* cited by examiner

*Primary Examiner*—Robert Beausoliel
*Assistant Examiner*—Joseph D Manoskey
(74) *Attorney, Agent, or Firm*—Blakely, Sokoloff, Taylor & Zafman LLP

(57) ABSTRACT

Embodiments of the invention are generally directed to systems, methods, and apparatuses for memory replay mechanisms. In some embodiments, the replay logic includes reset logic to reset at least some of the links in a point-to-point memory interconnect. In addition, the replay logic may include a replay queue to store transaction data and a replay controller to initiate a reset if the transaction data indicates a defined transaction response error. Other embodiments are described and claimed.

30 Claims, 13 Drawing Sheets

MEMORY REPLAY MECHANISM

TECHNICAL FIELD

Embodiments of the invention generally relate to the field of integrated circuits and, more particularly, to systems, methods, and apparatuses for a memory replay mechanism.

BACKGROUND

Memory systems typically include a specified level of support for reliability, availability, and serviceability (RAS). The support for RAS may include support for detecting and/or correcting certain memory content errors. In addition, the support for RAS may include support for detecting and/or correcting certain signaling errors that generate faulty bits at the receiver.

The error detecting and/or correcting mechanisms typically involve adding redundant information to data to protect the data from specified faults. One example of an error detecting mechanism is a cyclic redundancy code (CRC). An example of an error correcting mechanism is an error correction code (ECC).

As processor speeds increase there is a corresponding pressure to increase the data rate supported by the memory bus. Typically, conventional memory buses are based on a multi-point (often referred to as a multi-drop) architecture. This conventional multi-point memory bus architecture is increasingly disfavored in light of the demand for significant increases in memory speed and size.

Point-to-point memory interconnects frequently support higher data rates than conventional memory buses. Point-to-point memory interconnects may use memory modules having buffers to isolate the memory interconnect from the memory devices on the module. Examples of point-to-point memory architectures include those based on fully-buffered dual inline memory module (DIMM) technology. Fully-buffered DIMM technology refers to a memory architecture that is based, at least in part, on any of the fully-buffered DIMM specifications promulgated by the Solid State Technology Organization (JEDEC). The higher data rates supported by point-to-point memory architectures, such as fully-buffered DIMM, present new challenges for providing an appropriate level of RAS.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for memory replay mechanisms. In some embodiments, the replay logic analyzes the transaction response data of in-flight transactions to determine whether it contains a defined transaction response error. If it does, then the replay mechanism performs a hardware-based reset of the links of the memory interconnect. The replay logic may then replay the transaction. As is further described below, the replay logic may support a wide range of memory data transactions including: memory reads/writes, configuration reads/writes, re-silver transactions, memory scrubs, spare copy transactions, and the like.

Figure 1:
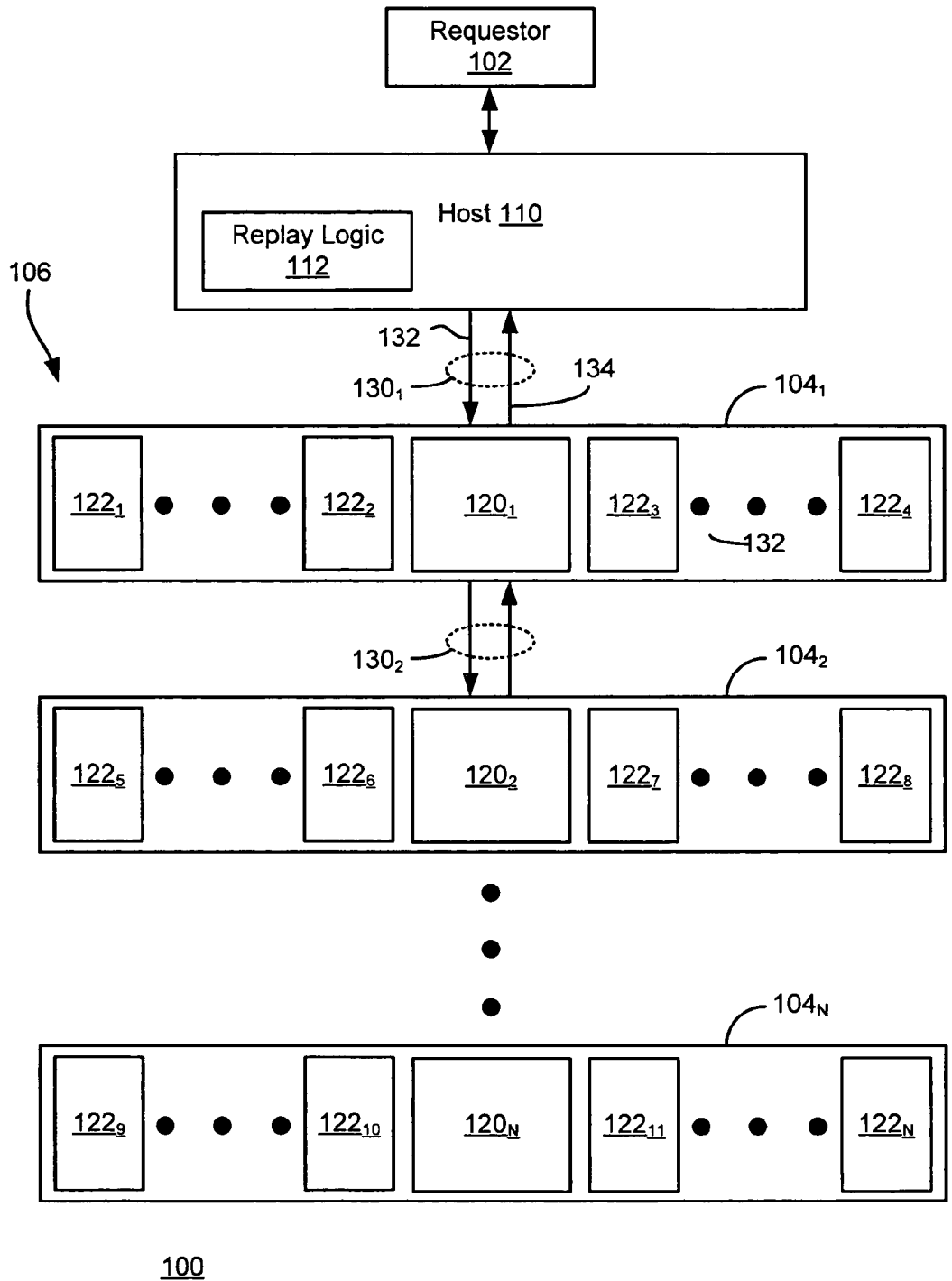
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. Computing system 100 includes requestor 102, host 110, and one or more memory modules 104. Requestor 102 may be a processor (e.g., a central processing unit and/or a core), a service processor, an input/output device (e.g., a peripheral component interconnect (PCI) Express device), memory itself, or any other element of system 100 that requests access to memory.

Memory module(s) 104 may have any of a wide variety of structures and pin configurations. For example, memory module 104 may be structured as a dual inline memory module (DIMM), a small outline DIMM (SO-DIMM), a micro DIMM, and the like. Memory module(s) 104 may be coupled to interconnect 130 with an electrical contact connector having nearly any pin configuration including 240-pin, 144-pin, 72-pin, etc.

Memory module(s) 104 include memory devices 122. For ease of illustration four memory devices are shown. It is to be appreciated that embodiments of the invention may include more memory devices or fewer memory devices. Memory devices 122 may be any of a wide variety of memory devices including, for example, dynamic random access memory devices (DRAMs).

In some embodiments, each memory module 104 includes a buffer 120. Buffer 120 isolates memory devices 122 from interconnect 130. In some embodiments, system 100 is based, at least in part, on fully-buffered DIMM technology. In such embodiments, buffer 120 may be an advanced memory buffer (AMB). In some embodiments, buffer 120 sends an alert (or a stream of alerts) to host 110 if it detects certain errors in memory transactions that it receives from host 110. For example, buffer 120 may send an alert if it detects a signaling error in write data (e.g., a CRC error), an error in a read command, and the like. Similarly buffer 120 may provide an acknowledge response (or simply, an acknowledge) if, for example, it successfully receives a memory write.

Interconnect 130 is a point-to-point interconnect. A point-to-point interconnect broadly refers to an interconnect that is composed of one or more point-to-point links (e.g., $130_1$ and $130_2$). Interconnect 130 may be either differential or single-ended. In the illustrated embodiment, interconnect 130 includes one or more north bound bit-lanes 134 and one or more south bound bit-lanes 132. In some embodiments, interconnect 130 is based, at least in part, on fully-buffered DIMM technology.

Host 110 provides an interface between requestor 102 and main system memory (e.g., as provided by memory modules 104). In some embodiments, host 110 is a memory controller. The memory controller may be integrated with a processor or it may be implemented on a separate integrated circuit (e.g., a memory controller hub). Host 110 includes replay logic 112. Replay logic 112 provides a mechanism to replay a wide variety of memory transactions if certain transaction response errors are detected. The term "transaction response error" refers to an error detected in response to a memory transaction (e.g., a read transaction, a write transaction, a memory configuration, etc.). In some embodiments, replay logic 112 includes fast reset logic to automatically retrain the links of interconnect 130 if certain transaction response errors are detected. Replay logic 112 is further discussed below with reference to FIGS. 3-8.

Figure 2:
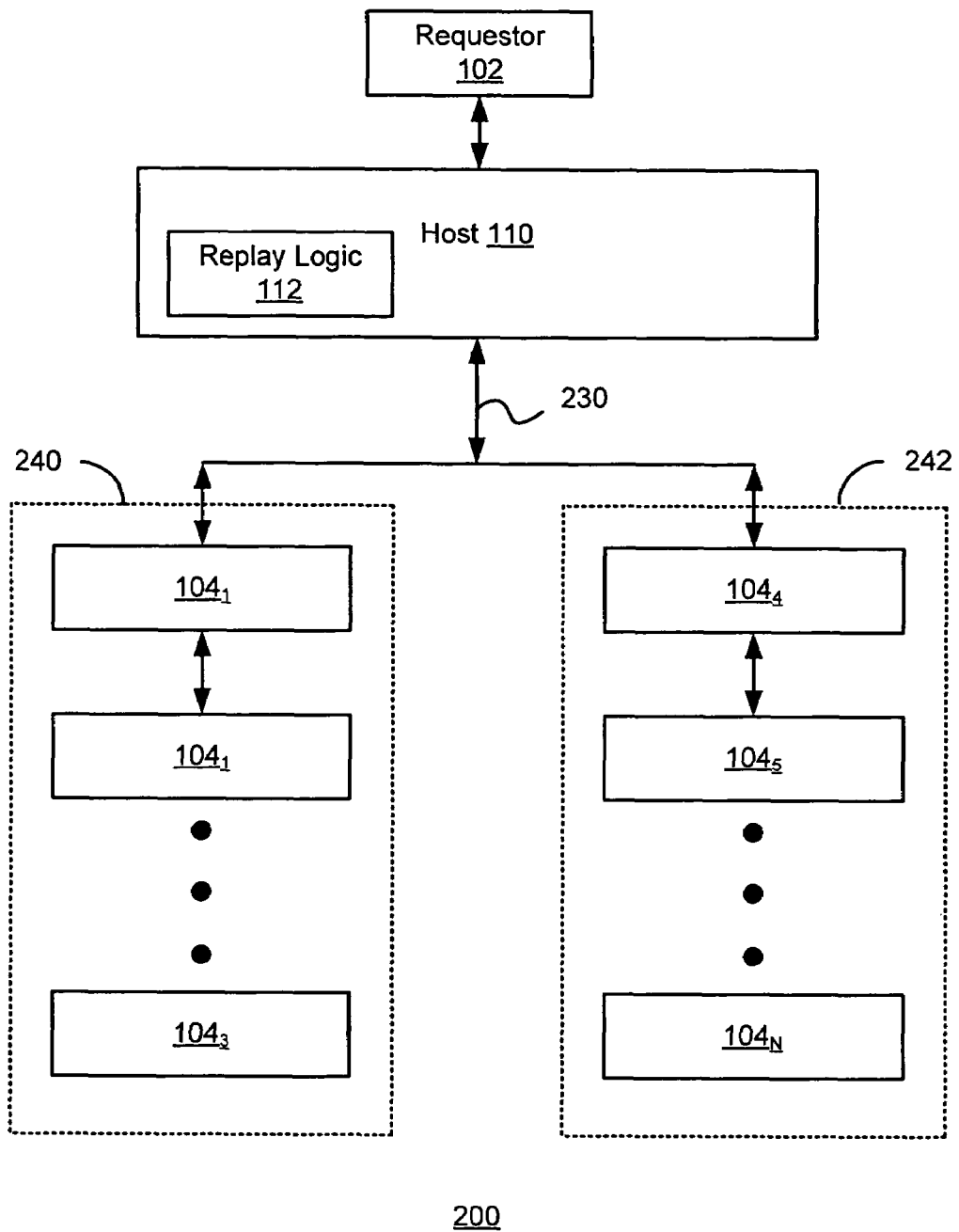
FIG. 2 is a high-level block diagram illustrating selected aspects of a memory system having multiple branches, according to an embodiment of the invention.

In some embodiments, interconnect 130 includes two or more branches. A branch refers to a collection of channels operating in lock-step. A branch can be a single channel. The additional branches may be used to support a redundant (or mirrored) memory in which there are two (or more) substantially identical images of memory. FIG. 2 is a high-level block diagram illustrating selected aspects of a memory system having multiple branches, according to an embodiment of the invention.

Computing system 200 includes requestor 102, host 110, and point-to-point interconnect 230. Point-to-point interconnect 230 includes branches 240 and 242 (each having one or more memory modules 104). In some embodiments, computing system 200 provides a redundant memory system in which branches 240 and 242 contain substantially identical images of memory. That is, branch 240 may contain essentially the same data as branch 242. In some embodiments, requester 102 can read data from either image. In some embodiments, data writes from requestor 102 are written to both branch 240 and branch 242.

Figure 3:
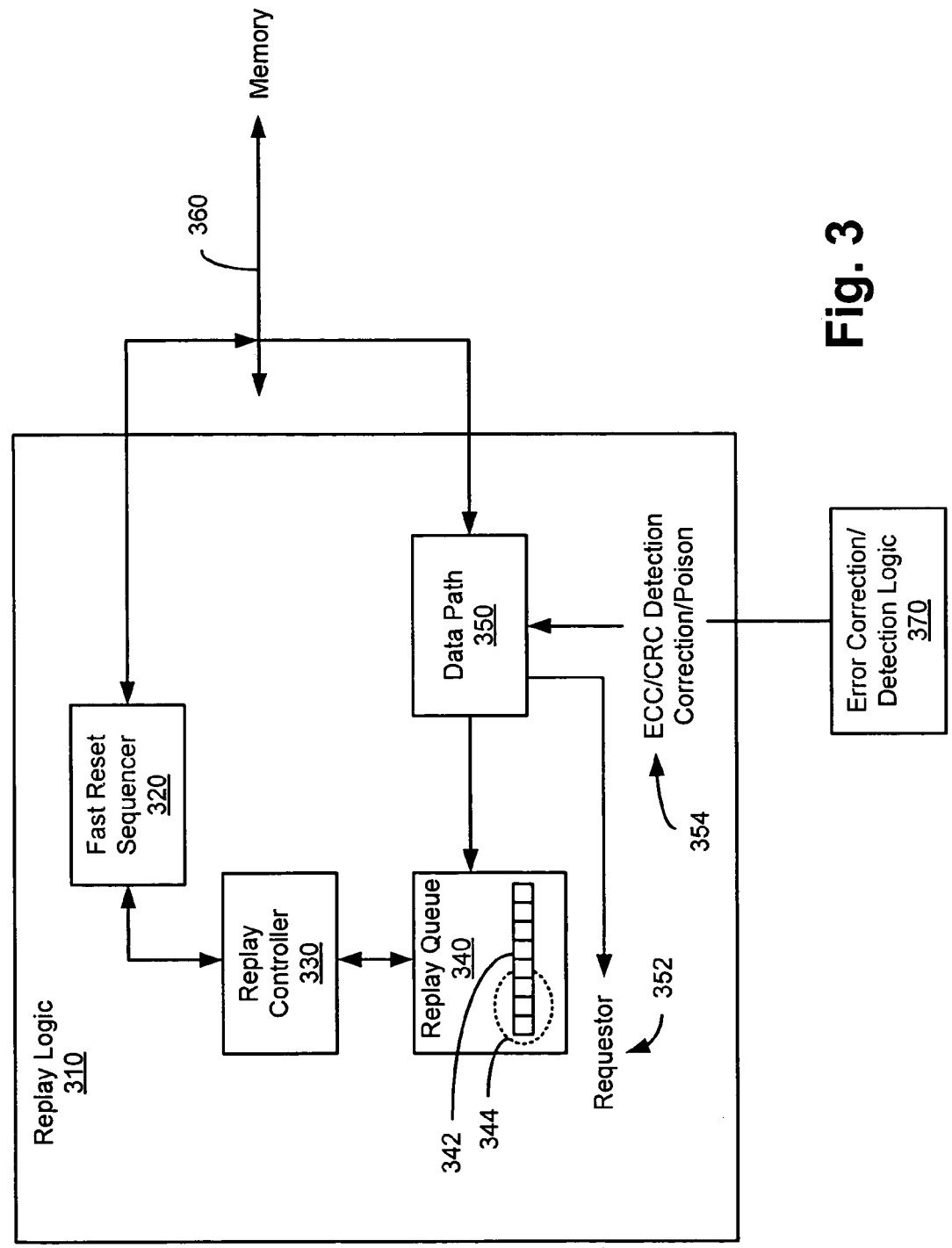
FIG. 3 is a block diagram illustrating selected aspects of replay logic according to an embodiment of the invention.

FIG. 3 is a block diagram illustrating selected aspects of replay logic according to an embodiment of the invention. In some embodiments, replay logic 310 provides a mechanism to replay memory transactions if certain transaction response errors are detected. For example, replay logic 310 may receive transaction response data from memory (e.g., memory 106, shown in FIG. 1) and determine whether the transaction response data includes a transaction response error. As is further described below, if replay logic 310 detects a response error, then it may initiate a replay of the memory transaction that produced the response error.

Replay logic 310 includes fast reset sequencer 320, replay controller 330, replay queue 340, and data path 350. In alternative embodiments, replay logic 310 may include more elements, fewer elements, and/or different elements than those illustrated in FIG. 3. Interconnect 360 couples replay logic 310 to one or more memory modules (e.g., memory modules 104, shown in FIG. 1). In some embodiments, interconnect 360 is based, at least in part, on fully-buffered DIMM technology.

Data path 350 receives transaction response data from interconnect 360. The transaction response data may include, for example, read data, an acknowledgement, and/or an alert. An alert refers to an alert from a buffer (e.g., buffer 120, shown in FIG. 1) indicating a command error and/or a data error in the communications between a host and memory. In some embodiments, data path 350 interacts with error detection/correction logic 370 to determine whether the transaction response data includes an error (e.g., a signaling error and/or a memory content error). Error detection/correction logic 370 determines whether the transaction response data contains a transaction response error. Error detection/correction logic 370 may be any error detection/correction logic suitable for detecting signaling errors and/or memory content errors. For example, error detection/correction logic 370 may be an ECC and/or a CRC.

Replay queue 340 tracks in-flight memory transactions. An "in-flight" memory transaction refers to a transaction that has been issued on a memory subsystem but has not yet been retired. For each transaction, data path 350 forwards transaction data 342 to replay queue 340. Transaction data 342 may include, for example, a transaction identifier (ID), addressing information, initiator (ID), and the like. In some embodiments, transaction data 342 also includes an indicator of whether the transaction response data contains a transaction response error. For example, in the illustrated embodiment, transaction data 342 includes status bits 344. Status bits 344 indicate whether certain transaction response errors were detected in the transaction response data. In some embodiments, there are three status bits 344 and each of these status bits indicate whether one of the following response errors was detected: an alert, a CRC error, and an uncorrectable ECC error. In alternative embodiments, there may be a different number of status bits and/or the status bits may indicate more, fewer, and/or different transaction response errors.

Replay controller 330 controls selected aspects of replay logic 310. In some embodiments, replay controller 330 analyzes the transaction data (e.g., 342) stored in replay queue 340 and determines an appropriate replay process based on factors such as (1) the detected transaction response error, (2) whether the memory system is redundant, (2) and the type of transaction (e.g., memory read/write, configuration read/write, etc.). The replay processes controlled by replay controller 330 are further discussed below with reference to FIGS. 4-9.

In some embodiments almost any kind of information transfer may be replayed. The term "information transfers" refers to transfers that contain data. The data may be memory data (e.g., for either memory reads or memory writes) or the data may be configuration data (e.g., to configure various aspects of a memory module, its buffer, and/or the DRAMs). The memory data transactions can come from a wide variety of both external and/or internal requestors. An external requester may include a processor, an I/O device, a system management bus, and the like. An internal requestor may include the host (e.g., a memory controller) itself. For example, the host may generate memory data transactions such as re-silver transactions, scrub transactions, spare-copy transactions, and the like. A "re-silver transaction" refers to a transaction is which data is recopied to a redundant branch (e.g., after data has been lost in the redundant branch). A "spare-copy transaction" refers to copying data to a redundant rank, as needed, to create a spare-copy. A rank is the set of memory devices that provide the data. A scrub transaction refers to scrubbing the data stored in the memory subsystem, for example, to repair correctable errors within memory.

Replay controller 330 also controls fast reset sequencer 320. Fast reset sequencer 320 is a hardware-based link/channel retraining mechanism. The term "link/channel retraining" refers to realigning all (or some) of the bit lanes on the links of the memory interconnect (e.g., interconnect 130, shown in FIG. 1). In some embodiments, fast reset sequencer 320 implements a hardware-based link/channel training algorithm that is simpler (and, therefore, faster) than the relatively complex (and software-based) initial training sequence that is typically pushed over from the built-in operating-system (BIOS). In operation, replay controller 330 may automatically instruct fast reset sequencer 320 to initiate a fast reset if certain transaction response errors are detected in transaction data 342. For example, in some embodiments, replay controller 330 instructs fast reset sequencer 320 to initiate a fast reset if status bits 344 indicate any of the following errors: an alert, a CRC error, or an uncorrectable ECC error.

In general, the operation of replay logic 310 includes receiving transaction response data from point-to-point interconnect 360 and determining whether that data includes certain transaction response errors. If it does, then replay controller 330 initiates a fast reset and then conducts a replay of the transaction (e.g., a replay transaction). The details of the replay transaction may vary depending on the type of transaction that is being replayed (e.g., memory read/write, configuration read/write, etc.) and whether the memory system is redundant. The operation of replay logic 310 is further discussed below with reference to FIGS. 4-9.

Figure 4:
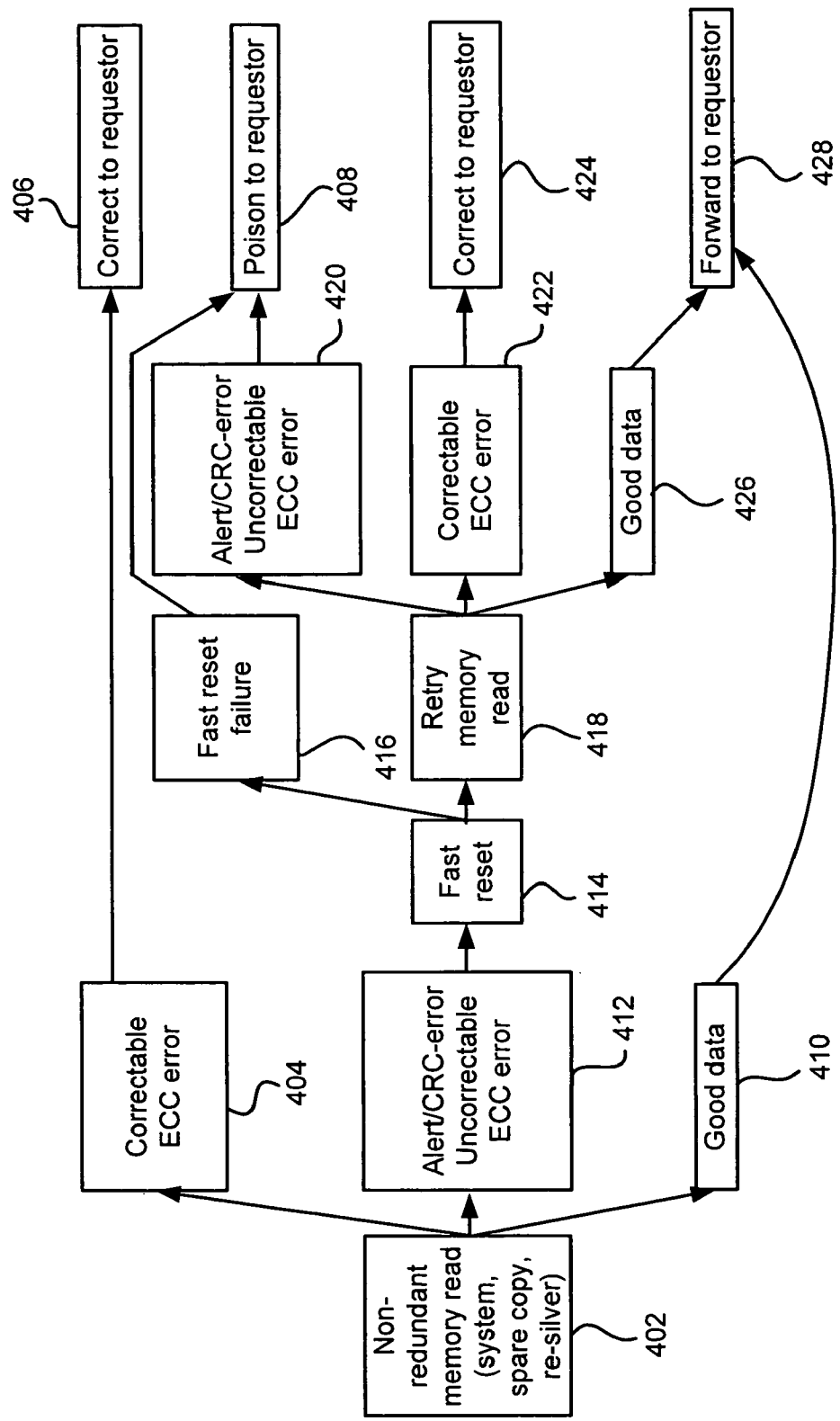
FIG. 4 is a flow diagram illustrating selected aspects of a method for a non-redundant memory read, according to an embodiment of the invention.

FIG. 4 is a flow diagram illustrating selected aspects of a method for a non-redundant memory read, according to an embodiment of the invention. The term "non-redundant memory read" refers to a memory read in a non-redundant memory system. Either an external requestor or an internal requester (e.g., during a spare-copy or re-silver transaction) may generate the non-redundant memory read as shown by 402.

The replay logic (e.g., replay logic 310, shown in FIG. 3) determines whether the transaction response data includes certain defined errors as shown by process blocks 404, 410, and 412. In some embodiments, the defined errors include an alert, a CRC error, and an uncorrectable ECC error. If the replay logic does not detect a defined error, then the transaction can be completed without a replay (410). For example, if the data does not include an error (410) then it is forwarded to the requestor 428. Similarly, if the data includes an ECC correctable error (404), then error detection/correction logic corrects the error and the data is forwarded to the requestor 406.

Referring to process block 412, however, the replay logic detects one of the defined errors in the response data. In some embodiments, the replay logic automatically conducts a fast reset (414), if the response data does include one of the defined errors. If the fast reset is unsuccessful (416), then the data is poisoned and the requestor is informed 408.

Alternatively, if the fast reset is successful, then the replay controller replays the transaction that generated the error (418). The replay transaction response data (replay response data) is analyzed to determine whether it includes one of the defined errors as shown by 420, 422, and 426. If the data does not contain one of the defined errors (422 and 426), then it is either forwarded to the requestor (428) or, in the case of an ECC correctable error, the error is corrected and then the data is forwarded to the requestor (424). If the replay response data does contain one of the defined errors, then it is poisoned and the requester is informed (408).

Figure 5:
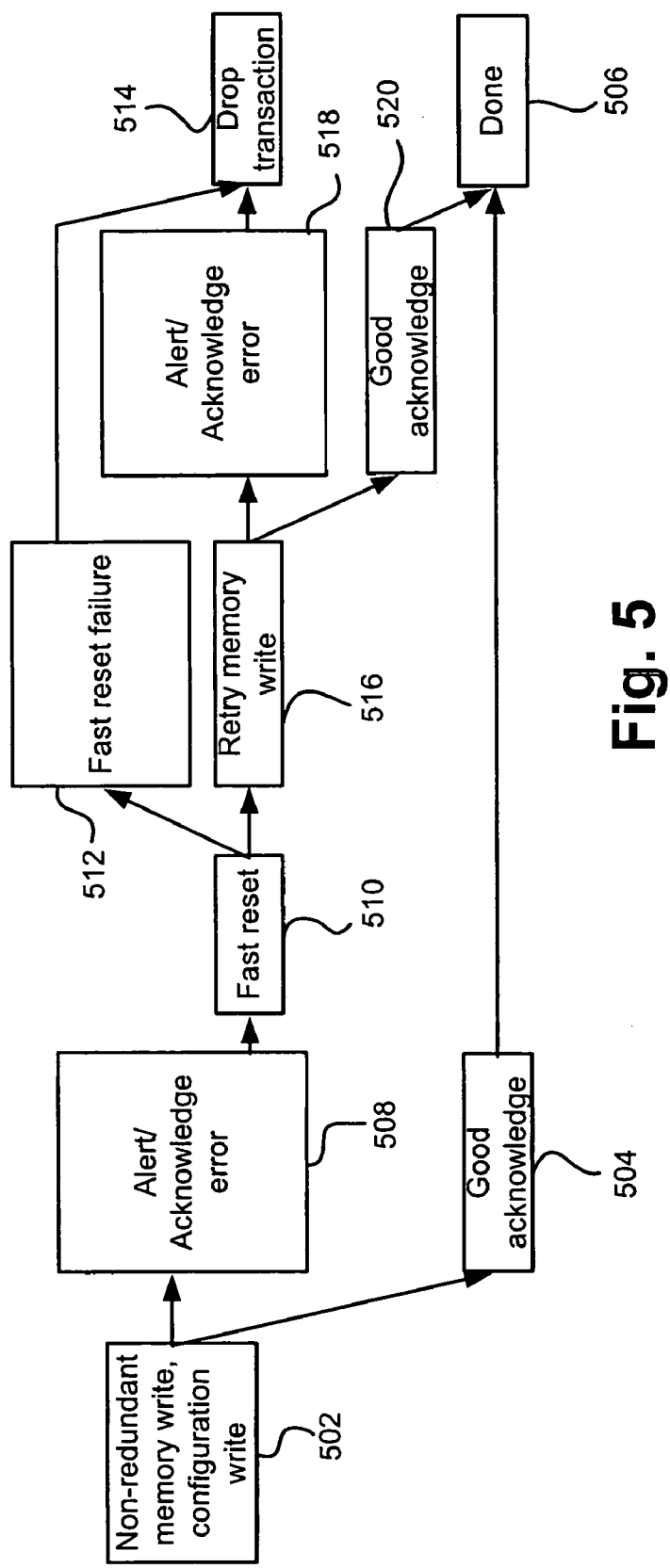
FIG. 5 is a flow diagram illustrating selected aspects of a method for a non-redundant memory write, according to an embodiment of the invention.

FIG. 5 is a flow diagram illustrating selected aspects of a method for a non-redundant memory (or configuration) write, according to an embodiment of the invention. The term "non-redundant memory write" refers to a memory write in a non-redundant memory system. Referring to process block 502, the host (e.g., host 110) performs a memory write. The replay logic analyzes the transaction response data to determine whether it contains a defined error (504 and 508). If it does not contain a defined error (504), then the transaction is completed (506).

Referring to process block 508, the response data contains one of the defined errors. In some embodiments, the defined errors include an alert and/or an acknowledge error. The replay logic performs a fast reset, if the response data contains one of the defined errors (510) and determines whether the fast reset is successful. If the fast reset is unsuccessful (512), then the transaction is dropped (514).

Alternatively, if the fast reset is successful, then the memory write is replayed (516). The replay response data is analyzed to determine whether it contains certain defined errors (518 and 520). If the replay response does not contain one of the defined errors (e.g., if it indicates a good acknowledge), then the transaction is completed (506). If, however, the replay response does contain one of the defined errors (518), then the transaction is dropped (514).

Figure 6:
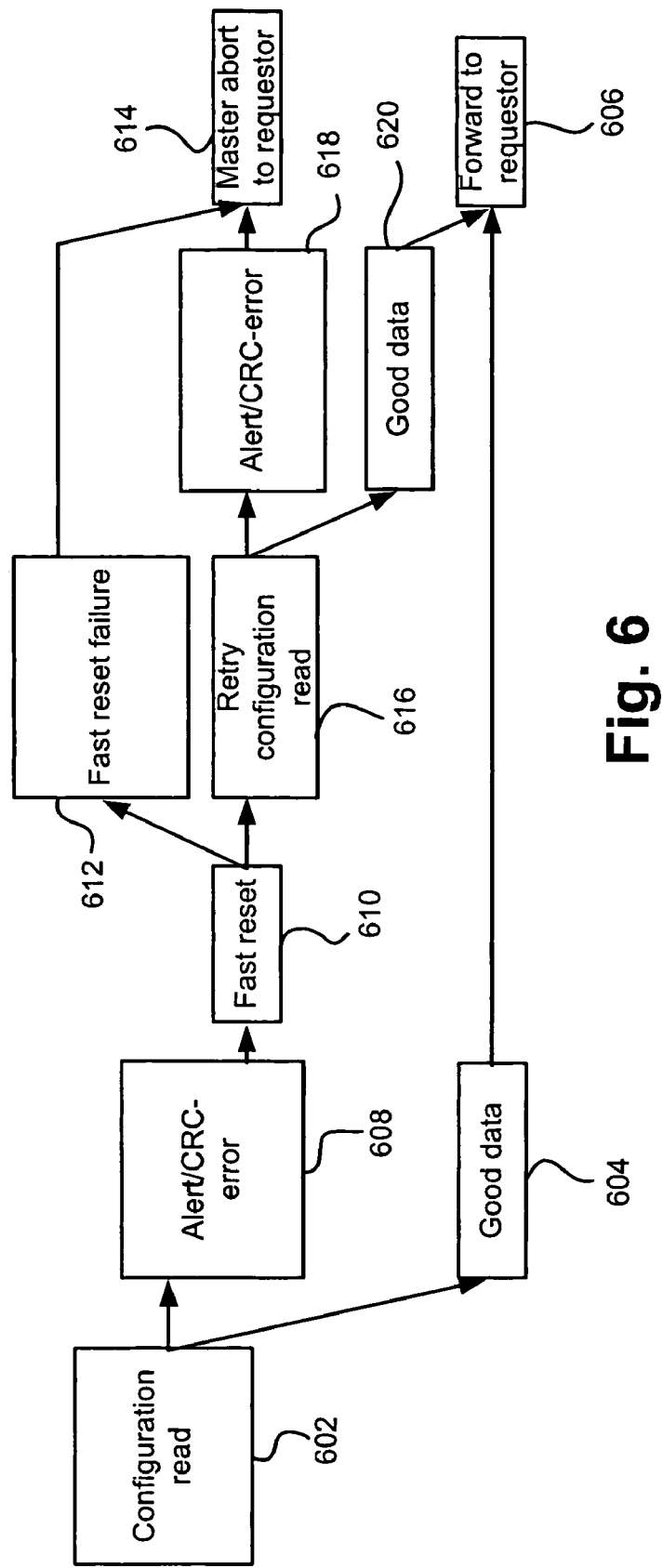
FIG. 6 is a flow diagram illustrating selected aspects of a method for a configuration read, according to an embodiment of the invention.

FIG. 6 is a flow diagram illustrating selected aspects of a method for a configuration read, according to an embodiment of the invention. The term "configuration read" refers to reading configuration information from elements of the memory (e.g., memory 106, shown in FIG. 1). In some embodiments, the buffers (e.g., buffer 120, shown in FIG. 1) located on the memory modules contain configuration data such as status bits, thermal data, and the like. A "configuration read" includes reading some or all of this configuration data from one or more memory buffers. The requester for a memory read may be either internal or external. One example of an external requestor is the system BIOS which may read and/or write configuration data to, for example, the memory modules.

Referring to process block 602, the host conducts a configuration read. The replay logic determines whether the transaction response data includes a defined error (604 and 608). If the response data is error free, then the host forwards the data to the requestor (606).

Referring to process block 608, however, the replay logic detects at least one of the defined errors. The defined errors may include, for example, an alert and/or a CRC error. In some embodiments, the replay logic automatically conducts a fast reset and determines whether the fast reset was successful, if it detects one of the defined errors (610). If the fast reset is unsuccessful (612), then the replay logic master aborts the transaction and informs the requester (614).

Alternatively, if the fast reset is successful, then the replay logic replays the configuration read (616). The replay logic analyzes the replay response data to determine whether it contains a defined error (618 and 620). If the replay response data does not contain a defined error (620), then the data is forwarded to the requestor (606). If the replay response data does, however, contain a defined error (618), then the replay logic master aborts the configuration and informs the requestor (614).

Figure 7:
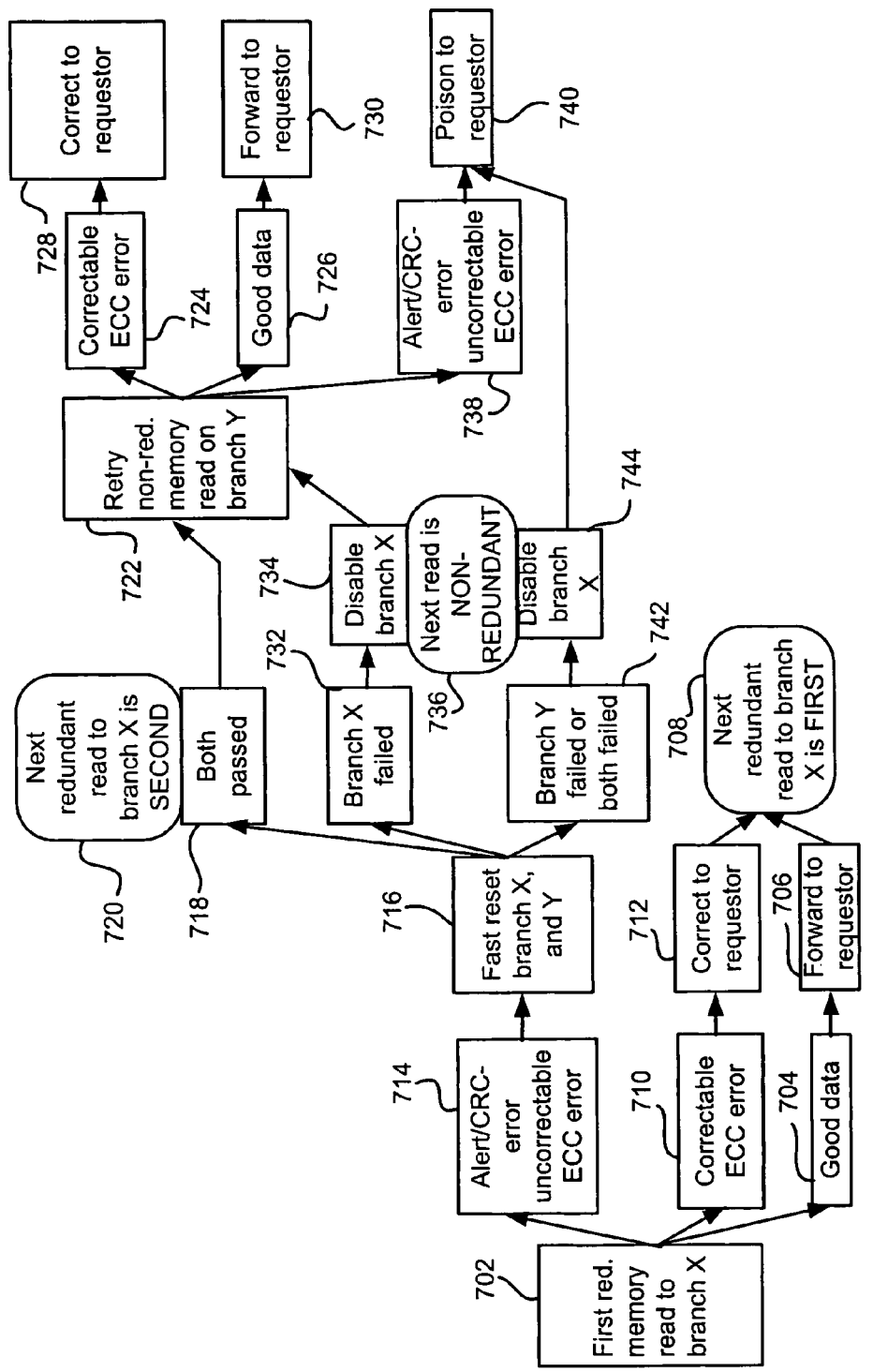
FIG. 7 is a flow diagram illustrating selected aspects of a redundant memory read according to an embodiment of the invention.

FIG. 7 is a flow diagram illustrating selected aspects of a redundant memory read according to an embodiment of the invention. The term "redundant memory read" refers to a memory read in a redundant memory system. In general, a redundant memory system may include two or more branches (e.g., branches 240 and 242, shown in FIG. 2). Each branch may contain a substantially identical image of memory. For ease of description, the term local branch is used to describe the branch on which a memory read transaction is issued. The term remote branch refers to a branch other than the branch on which the memory read is issued.

In some embodiments, the replay mechanism on a redundant memory system takes into account whether the transaction response errors that occur on a local branch exceed a degradation threshold. The term "degradation threshold" refers to a threshold for degrading a redundant memory system by, for example, disabling one of its branches. The degradation threshold may be determined by a wide range of criteria (and/or policies) including a number of times that a transaction response occurs, a frequency at which the transaction error occurs, and the like. In one embodiment, the degradation threshold is based on two consecutive transaction response errors being detected on the same branch. For ease of description, embodiments are described below with respect to a two consecutive read based degradation threshold. It is to be appreciated that alternative embodiments may be based on a different degradation threshold.

Referring to process block 702, the host performs a first redundant memory read to branch X. The term "redundant memory read" refers to a memory read in a redundant memory system. A "first" redundant memory read refers to a memory read that has not exceeded the degradation threshold. The terms "branch X" and "branch Y" are used as convenient labels to distinguish between two branches in an redundant memory system. For the redundant memory read, branch "X" is the local branch, and branch "Y" is a remote branch.

The replay logic determines whether the transaction response data includes a defined error (714, 710, and 704). If the data does not contain a defined error, then any other errors (e.g., correctable ECC errors) are corrected (712), as necessary, and the data is forwarded to the requestor (712, 706). If a defined error is not detected, then the next redundant read is considered a first redundant read (708).

If, however, a defined error is detected (714), then the replay logic automatically conducts a fast reset on both branches and determines whether the fast reset is successful (716). If one or both of branches X and Y failed the fast reset (732, 742), then branch X is disabled (734, 744). If branch Y failed (or both branches failed), then the transaction is poisoned and the requestor is informed (740). If only branch X failed, then, after branch X is disabled, the process flow follows substantially the same process as when both branches pass the fast reset.

If both branches passed the fast reset (718), then the next redundant read is considered a "second" redundant read (720). The replay logic replays the non-redundant memory read on branch Y (e.g., the other branch) at 722. If the replay response data includes a defined error, then the transaction is poisoned and the requestor is informed (740). If not (724 and 726), then any other errors are corrected (728), if necessary, and the data is forwarded to the requestor (728 and 730).

Figure 8:
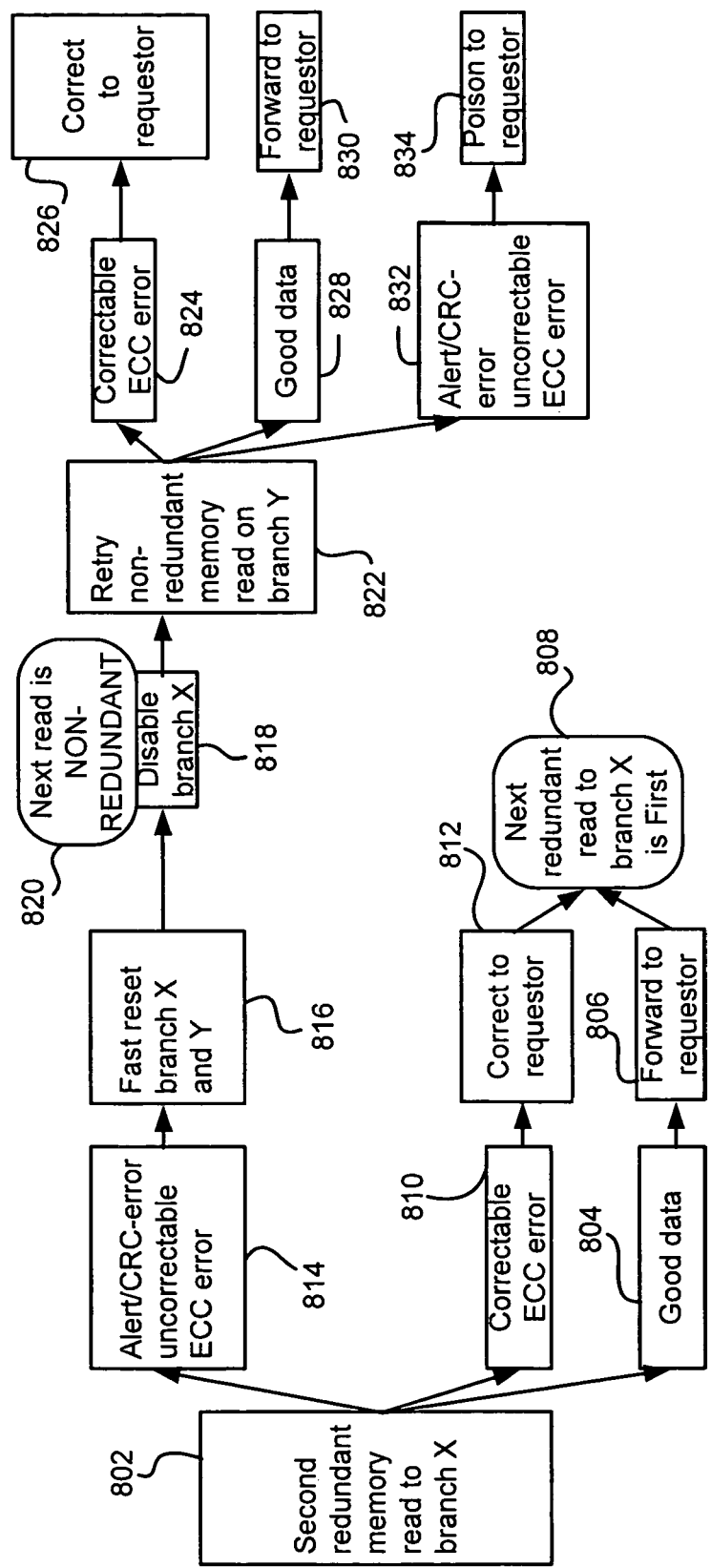
FIG. 8 is a flow diagram illustrating selected aspects of a redundant memory read and degradation of a memory branch according to an embodiment of the invention.

FIG. 8 is a flow diagram illustrating selected aspects of a redundant memory read and degradation of a memory branch according to an embodiment of the invention. For ease of description, the degradation threshold is assumed to be two consecutive response data errors from the same branch. It is to be appreciated that, in alternative embodiments, a different degradation threshold may be used.

Referring to process block 802, the replay logic conducts a second redundant memory read to branch X. That is, the previous redundant memory read to branch X resulted in one of the defined transaction response errors. The replay logic determines whether the response data includes a defined error (814, 810, and 804). If the response data does not contain a defined error (810 and 804), then any other errors are corrected, if necessary, and the data is forwarded to the requestor (812 and 806). In some embodiments, a subsequent redundant memory read is considered a "first" redundant memory read, if the response data does not contain a defined error (808).

If the response data does contain a defined error (814), then the replay logic conducts a fast reset on both branch X and branch Y (816). In some embodiments, branch X is disabled (818) to support a consistent implementation and the next read is a non-redundant read (820). The replay logic replays the non-redundant memory read on branch Y (e.g., the opposite branch) at 822. If the replay response data includes a defined error (832), then the transaction is poisoned and the requestor is informed (834). If not (824 and 828), then any other errors are corrected (826), if necessary, and the data is forwarded to the requester (826 and 830).

Figure 9:
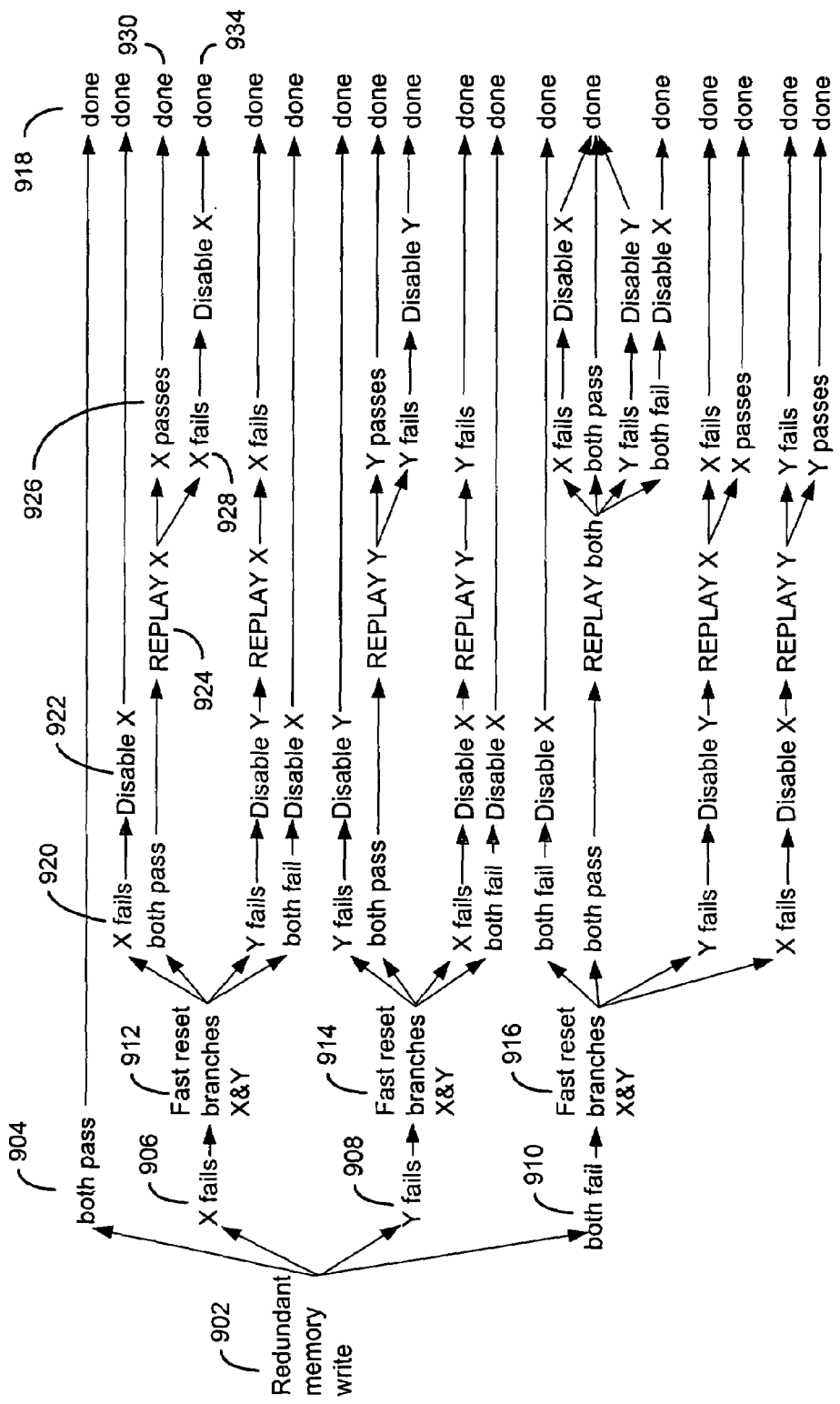
FIG. 9 is a flow diagram illustrating selected aspects of a redundant memory write according to an embodiment of the invention.

FIG. 9 is a flow diagram illustrating selected aspects of a redundant memory write according to an embodiment of the invention. A "redundant memory write" refers to writing to a redundant memory system. The host performs a redundant memory write (902) to both branches and determines whether the response data includes a defined error (904-910). If the response data does not include a defined error (904), then the transaction is completed 918. If the response data from either branch does contain a defined error (906-910), then the replay logic conducts a fast reset of both branches (912-916) and determines whether the fast reset was successful for each branch.

If either branch fails the fast reset (e.g., 920), then the failing branch is disabled (e.g., 922). If both branches pass, then the redundant memory write is replayed to the same branch whose failure led to the fast reset (924). The replay response data is checked for defined errors (e.g., 926 and 928). If it does not contain a defined error, then the transaction is completed (e.g., 930). Otherwise, the branch on which the transaction was replayed is disabled (e.g., 932) and the transaction is completed (e.g., 934). FIG. 9 also illustrates additional combinations of branch failures, branch disables, and replays, according to some embodiments of the invention.

Scrub During Replay

Figure 10:
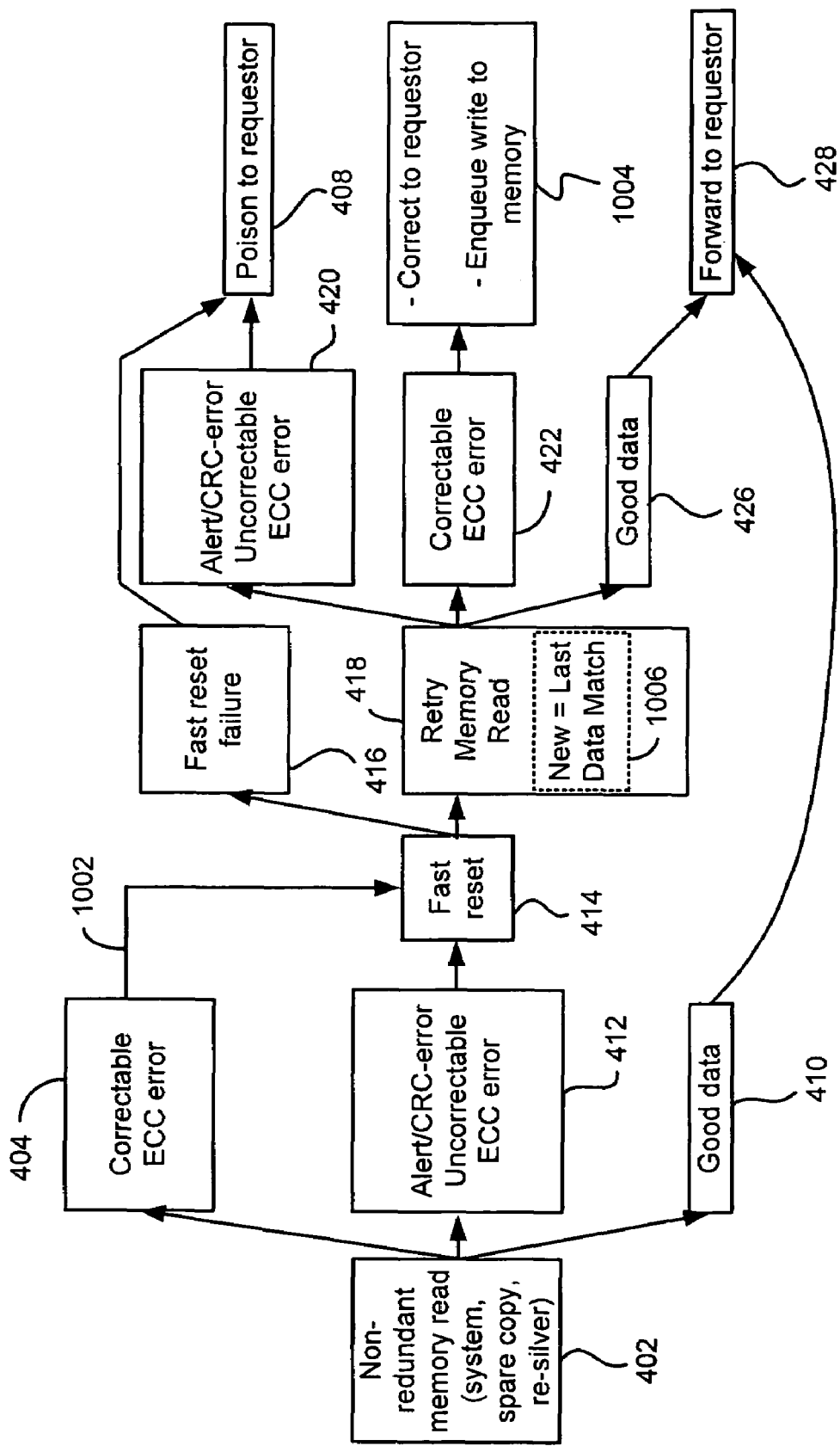
FIG. 10 is a flow diagram illustrating selected aspects of a method for a non-redundant memory read with a scrub during replay, according to an embodiment of the invention
Figure 11:
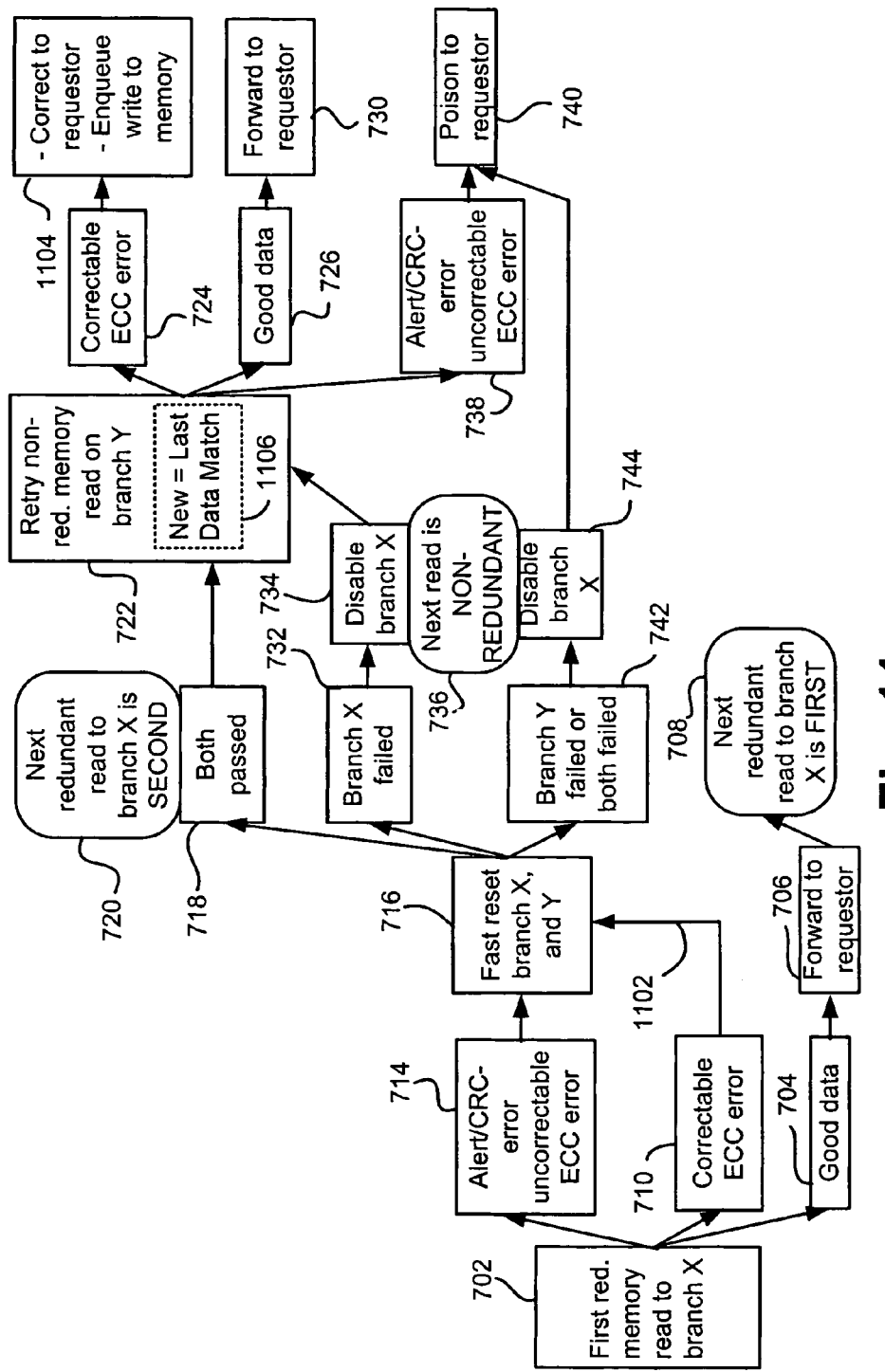
FIG. 11 is a flow diagram illustrating selected aspects of a redundant memory read with a scrub during replay, according to an embodiment of the invention.
Figure 12:
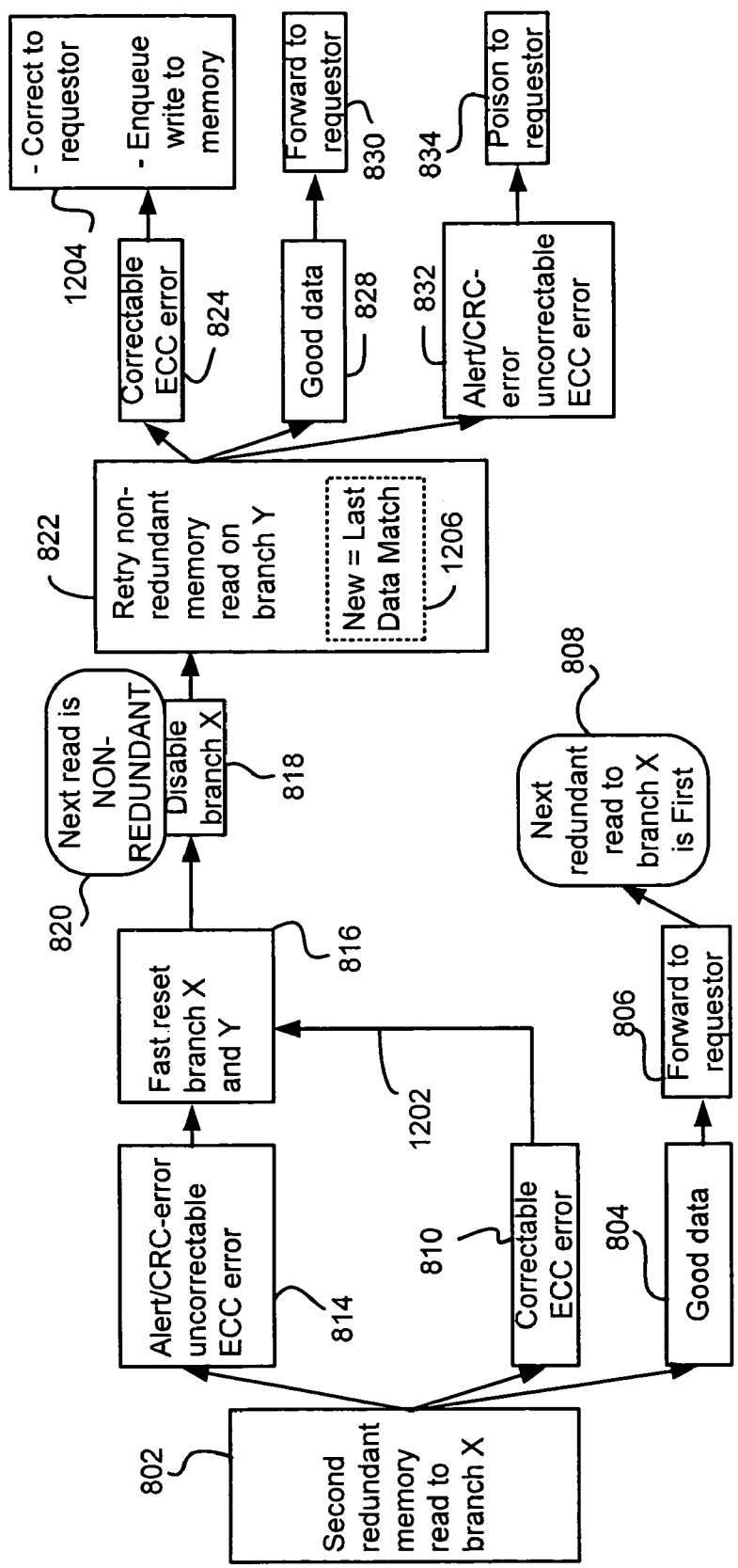
FIG. 12 is a flow diagram illustrating selected aspects of a redundant memory read and degradation of a memory branch with a scrub during replay, according to an embodiment of the invention.

In some embodiments, the transaction response errors that are automatically replayed include correctable errors such as ECC correctable errors. In such embodiments, a demand scrub during replay may be implemented. The term "demand scrub" refers to repairing a correctable error in memory if it is detected during a replay operation. FIGS. 10, 11, and 12 are, respectively, similar to FIGS. 4, 7, and 8 except that each of FIGS. 10, 11. 12 illustrate selected aspects of implementing a demand scrub during replay. For ease of reference, the discussion of FIGS. 10, 11, and 12 focuses on the demand scrub during replay feature.

In the illustrated embodiments, the detection of a correctable error (e.g., an ECC correctable error) automatically triggers a reset as shown by 1002, 1102, and 1202. If the reset is successful, then the transaction is replayed (418, 722, and 822). The replay transaction response data is analyzed to determine whether it includes an error.

If the replay transaction response data contains a correctable error, then the error is corrected, the corrected response data is forwarded to the requestor, and a copy of the corrected data is written to memory (e.g., 1004, 1104, and 1204). The write-to-memory phase in the replay creates the opportunity for a "nested" replay on a bad response to write. Thus, in some embodiments, any further errors on the write are treated as an entirely new write.

In some embodiments, the host may be able to detect either of the following fault combinations: a signaling fault in both the "new" response data and the previous response data; and/or a combination of a signaling fault with a soft error. In such an embodiment, the "new" response data (obtained after the replay operation) is compared (at least partly) with the response data from the preceding read operation (e.g., 1006, 1106, 1206). If the "new" response data matches the previously transmitted response data, then no signaling fault occurred, and the ECC logic can be used as normal to separate correctable or uncorrectable faults, and complete the proper operation on the data. If the "new" data does not match the previously transmitted data, then a signaling fault occurred in one of the two transmissions, and another retry operation is performed until the data from two sequential transmissions match.

Figure 13:
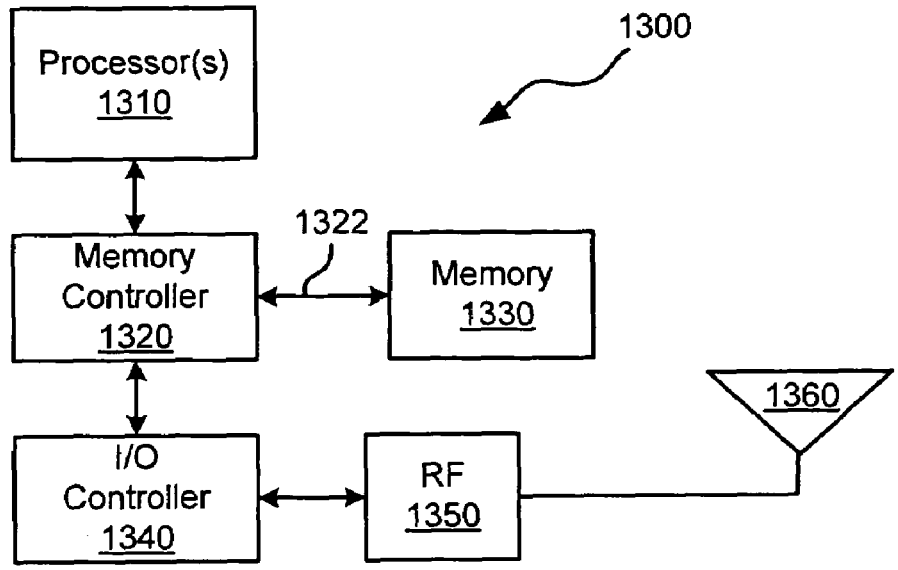
FIG. 13 is a block diagram illustrating selected aspects of an electronic system, according to an embodiment of the invention.

FIG. 13 is a block diagram illustrating selected aspects of an electronic system according to an embodiment of the invention. Electronic system 1300 includes processor 1310, memory controller 1320, memory 1330, input/output (I/O) controller 1340, radio frequency (RF) circuits 1350, and antenna 1360. In operation, system 1300 sends and receives signals using antenna 1360, and these signals are processed by the various elements shown in FIG. 13. Antenna 1360 may be a directional antenna or an omni-directional antenna. As used herein, the term omni-directional antenna refers to any antenna having a substantially uniform pattern in at least one plane. For example, in some embodiments, antenna 1360 may be an omni-directional antenna such as a dipole antenna or a quarter wave antenna. Also, for example, in some embodiments, antenna 1360 may be a directional antenna such as a parabolic dish antenna, a patch antenna, or a Yagi antenna. In some embodiments, antenna 1360 may include multiple physical antennas.

Radio frequency circuit 1350 communicates with antenna 1360 and I/O controller 1340. In some embodiments, RF circuit 1350 includes a physical interface (PHY) corresponding to a communication protocol. For example, RF circuit 550 may include modulators, demodulators, mixers, frequency synthesizers, low noise amplifiers, power amplifiers, and the like. In some embodiments, RF circuit 1350 may include a heterodyne receiver, and in other embodiments, RF circuit 1350 may include a direct conversion receiver. For example, in embodiments with multiple antennas 1360, each antenna may be coupled to a corresponding receiver. In operation, RF circuit 1350 receives communications signals from antenna 1360 and provides analog or digital signals to I/O controller 1340. Further, I/O controller 1340 may provide signals to RF circuit 1350, which operates on the signals and then transmits them to antenna 1360.

Processor(s) 1310 may be any type of processing device. For example, processor 1310 may be a microprocessor, a microcontroller, or the like. Further, processor 1310 may include any number of processing cores or may include any number of separate processors.

Memory controller 1320 provides a communication path between processor 1310 and other elements shown in FIG. 13. In some embodiments, memory controller 1320 is part of a hub device that provides other functions as well. As shown in FIG. 13, memory controller 1320 is coupled to processor(s) 1310, I/O controller 1340, and memory 1330. In some embodiments, memory controller 1320 includes replay logic (e.g., replay logic 310, shown in FIG. 3) to detect defined errors, conduct automatic fast resets, and replay certain transactions.

Memory 1330 may include multiple memory devices. These memory devices may be based on any type of memory technology. For example, memory 1330 may be random access memory (RAM), dynamic random access memory (DRAM), static random access memory (SRAM), nonvolatile memory such as FLASH memory, or nay other type of memory.

Memory 1330 may represent a single memory device or a number of memory devices on one or more modules. Memory controller 1320 provides data through interconnect 1322 to memory 1330 and receives data from memory 1330 in response to read requests. Commands and/or addresses may be provided to memory 1330 through interconnect 1322 or through a different interconnect (not shown). Memory controller 1330 may receive data to be stored in memory 1330 from processor 1310 or from another source. Memory controller 1330 may provide the data it receives from memory 1330 to processor 1310 or to another destination. Interconnect 1322 may be a bi-directional interconnect or a unidirectional interconnect. Interconnect 1322 may include a number of parallel conductors. The signals may be differential or single ended. In some embodiments, interconnect 1322 operates using a forwarded, multiphase clock scheme.

Memory controller 1320 is also coupled to I/O controller 1340 and provides a communications path between processor(s) 1310 and I/O controller 1340. I/O controller 1340 includes circuitry for communicating with I/O circuits such as serial ports, parallel ports, universal serial bus (USB) ports and the like. As shown in FIG. 13, I/O controller 1340 provides a communication path to RF circuits 1350.

Figure 14:
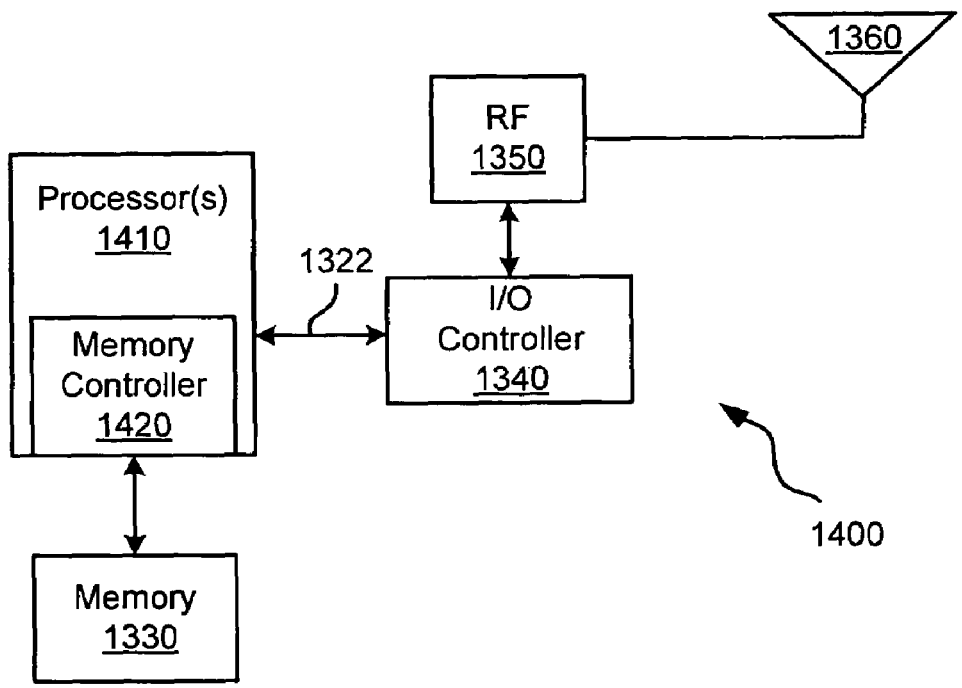
FIG. 14 is a block diagram illustrating selected aspects of an electronic system, according to an alternative embodiment of the invention.

FIG. 14 is a bock diagram illustrating selected aspects of an electronic system according to an alternative embodiment of the invention. Electronic system 1400 includes memory 1330, I/O controller 1340, RF circuits 1350, and antenna 1360, all of which are described above with reference to FIG. 13. Electronic system 1400 also includes processor(s) 1410 and memory controller 1420. As shown in FIG. 14, memory controller 1420 may be on the same die as processor(s) 1410. In some embodiments, memory controller 1420 includes replay logic (e.g., replay logic 310, shown in FIG. 3) to detect defined errors, conduct automatic fast resets, and replay certain transactions. Processor(s) 1410 may be any type of processor as described above with reference to processor 1310 (FIG. 5). Example systems represented by FIGS. 13 and 14 include desktop computers, laptop computers, servers, cellular phones, personal digital assistants, digital home systems, and the like.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An integrated circuit comprising:
    a reset logic to reset at least some links in a point-to-point memory interconnect;
    a replay queue to store transaction data associated with a memory transaction; and
    a replay controller logic coupled with the reset logic and the replay queue, the replay controller logic to initiate the reset if the transaction data indicates a defined transaction response error.

2. The integrated circuit of claim 1, wherein the defined transaction response error is one of:
    an alert from a memory module;
    a cyclic redundancy check (CRC) error; and
    an uncorrectable error check code (ECC) error.

3. The integrated circuit of claim 2, wherein the transaction data includes one or more status bits to indicate the defined transaction response error.

4. The integrated circuit of claim 1, wherein the replay controller logic is operable to initiate a replay of the memory transaction, if the reset is successful.

5. The integrated circuit of claim 4, wherein the memory transaction is a redundant information transfer and further wherein the reset logic is operable to reset both a local branch and a remote branch of the point-to-point memory interconnect.

6. The integrated circuit of claim 5, wherein the redundant information transfer comprises one of:
    a redundant memory read; and
    a redundant memory write.

7. The integrated circuit of claim 6, wherein the replay controller logic is operable to replay the memory transaction to the remote branch, if the redundant information transfer is a redundant memory read.

8. The integrated circuit of claim 7, wherein the replay controller comprises:
    a degradation logic to determine whether the local branch exhibits transaction response errors in excess of a degradation threshold and to disable the local branch, if the local branch exhibits transaction response errors in excess of the degradation threshold.

9. The integrated circuit of claim 6, wherein the replay controller logic is operable to replay the memory transaction to the local branch, if the redundant information transfer is a redundant memory write.

10. The integrated circuit of claim 1, wherein the point-to-point memory interconnect is a fully-buffered dual inline memory module (DIMM) memory interconnect.

11. The integrated circuit of claim 1, wherein the defined transaction response error includes a correctable ECC error and wherein the replay controller logic further includes logic to enqueue a write to memory.

12. A method comprising:
    receiving transaction data from a point-to-point memory interconnect, wherein the transaction data is associated with a transaction;
    detecting a transaction response error associated with the transaction; and
    initiating a fast reset responsive, at least in part, to detecting the transaction response error associated with the transaction, wherein the fast reset retrains at least some links in a point-to-point memory interconnect.

13. The method of claim 12, wherein the transaction response error includes at least one of:
    an alert from a memory module;
    a cyclic redundancy check (CRC) error; and
    an uncorrectable error check code (ECC) error.

14. The method of claim 12, further comprising:
    replaying the transaction, if the fast reset is successful.

15. The method of claim 14, wherein the transaction is a redundant information transfer and further wherein initiating a fast reset comprises:
    initiating a fast reset of both a local branch and a remote branch of the memory interconnect.

16. The method of claim 15, wherein the redundant information transfer comprises one of:
    a redundant memory read; and
    a redundant memory write.

17. The method of claim 16, wherein replaying the transaction comprises:
    replaying the transaction to the remote branch, if the redundant information transfer is a redundant memory read.

18. The method of claim 17, further comprising:
    determining whether the local branch exhibits transaction response errors in excess of a degradation threshold; and
    disabling the local branch, if the local branch exhibits transaction response errors in excess of the degradation threshold.

19. The method of claim 16, wherein replaying the transaction comprises:
    replaying the transaction to (the local branch) a branch exhibiting the transaction response error, if the redundant information transfer is a redundant memory write.

20. The method of claim 14, wherein the transaction is at least one of:
    a non-redundant memory read;
    a non-redundant memory write;
    a configuration read; and
    a configuration write.

21. The method of claim 12, wherein the point-to-point memory interconnect is a fully-buffered dual inline memory module (DIMM) memory interconnect.

22. A system comprises:
a memory module coupled with a point-to-point to memory interconnect; and
a memory controller coupled with the memory module through the point-to-point memory interconnect, the memory controller including,
a reset logic to reset at least a portion of the point-to-point memory interconnect;
a replay queue to store transaction data associated with a memory transaction; and
replay controller logic coupled with the reset logic and the replay queue, the replay controller logic to initiate the reset if the transaction data indicates a defined transaction response error.

23. The system of claim 22, wherein the defined transaction response error is one of:
an alert from a memory module;
a cyclic redundancy check (CRC) error; and
an uncorrectable error check code (ECC) error.

24. The system of claim 22, wherein the replay controller logic is operable to initiate a replay of the memory transaction, if the reset is successful.

25. The system of claim 24, wherein the memory transaction is a redundant information transfer and further wherein the reset logic is to reset both a local branch and a remote branch of the point-to-point memory interconnect.

26. The system of claim 25, wherein the redundant information transfer comprises one of:
a redundant memory read; and
a redundant memory write.

27. The system of claim 26, wherein the replay controller logic is operable to replay the memory transaction to the remote branch, if the redundant information transfer is a redundant memory read.

28. The system of claim 27, wherein the replay controller comprises:
degradation logic to determine whether the local branch exhibits transaction response errors in excess of a degradation threshold and to disable the local branch, if the local branch exhibits transaction response errors in excess of the degradation threshold.

29. The system of claim 26, wherein the replay controller logic is operable to replay the memory transaction to the local branch, if the redundant information transfer is a redundant memory write.

30. The system of claim 26, wherein the point-to-point memory interconnect is a fully-buffered dual inline memory module (DIMM) memory interconnect.

* * * * *